United States Patent [19]
Patti

[11] 3,938,012
[45] Feb. 10, 1976

[54] VARIABLE CAPACITOR
[75] Inventor: Vincent J. Patti, Norridge, Ill.
[73] Assignee: Standex International Corporation, Andover, Mass.
[22] Filed: Jan. 28, 1974
[21] Appl. No.: 436,865

[52] U.S. Cl. .............................................. 317/249 T
[51] Int. Cl.$^2$ ......................................... H01G 5/24
[58] Field of Search ........... 317/249 R, 249 T, 242, 317/261; 174/110 FC

[56] References Cited
UNITED STATES PATENTS

| | | | |
|---|---|---|---|
| 2,567,280 | 9/1951 | Foster | 317/249 T |
| 2,595,194 | 4/1952 | Heibel | 317/249 T |
| 2,686,879 | 8/1954 | Pan | 317/249 T |
| 2,748,327 | 5/1956 | Wadsworth | 317/249 T |
| 2,910,635 | 10/1959 | Abrams | 317/249 T |
| 3,271,641 | 9/1966 | Biggar | 317/249 T |
| 3,348,106 | 10/1967 | Vinz | 317/249 T |
| 3,482,154 | 12/1969 | Robinson | 317/242 |

FOREIGN PATENTS OR APPLICATIONS

| | | | |
|---|---|---|---|
| 420,055 | 11/1934 | United Kingdom | 317/249 |
| 541,712 | 12/1941 | United Kingdom | 317/249 |

OTHER PUBLICATIONS
Dupont Eng. Bulletin "Properties of Teflon" 52/1954, pp. 1–4.
Brady, Materials Handbook, N.Y., McGraw-Hill 1959, p. 292.

Primary Examiner—E. A. Goldberg
Attorney, Agent, or Firm—Mason, Kolehmainen, Rathburn & Wyss

[57] ABSTRACT

A capacitor having an elongated, generally tubular shape includes a metal clad dielectric sheet formed into an elongated, generally tubularly shaped core that is mounted between two conductive terminals and receives an elongated conductive member electrically connected to one of the conductive terminals. The axial position of the elongated conductive member within the core is variable to vary the capacitance of the capacitor. The method of making or assembling the capacitor includes the steps of forming first and second desired configurations of conductive material on one side of a substantially flat dielectric sheet, forming the dielectric sheet into an elongated, substantially tubularly shaped dielectric core with the first and second configurations of conductive material on the outer surface of the core, placing a first conductive terminal in a telescoping relationship over the first configuration of conductive material, placing a second conductive terminal in a telescoping relationship over the second configuration of conductive material and expanding the core radially outwardly by inserting an axially variably movable, elongated conductive member electrically connected with the first conductive terminal within the core to achieve a conforming contact between the elongated conductive member and the inner surface of the core, thereby providing a highly accurate, inexpensive and reliable variable capacitor.

13 Claims, 11 Drawing Figures

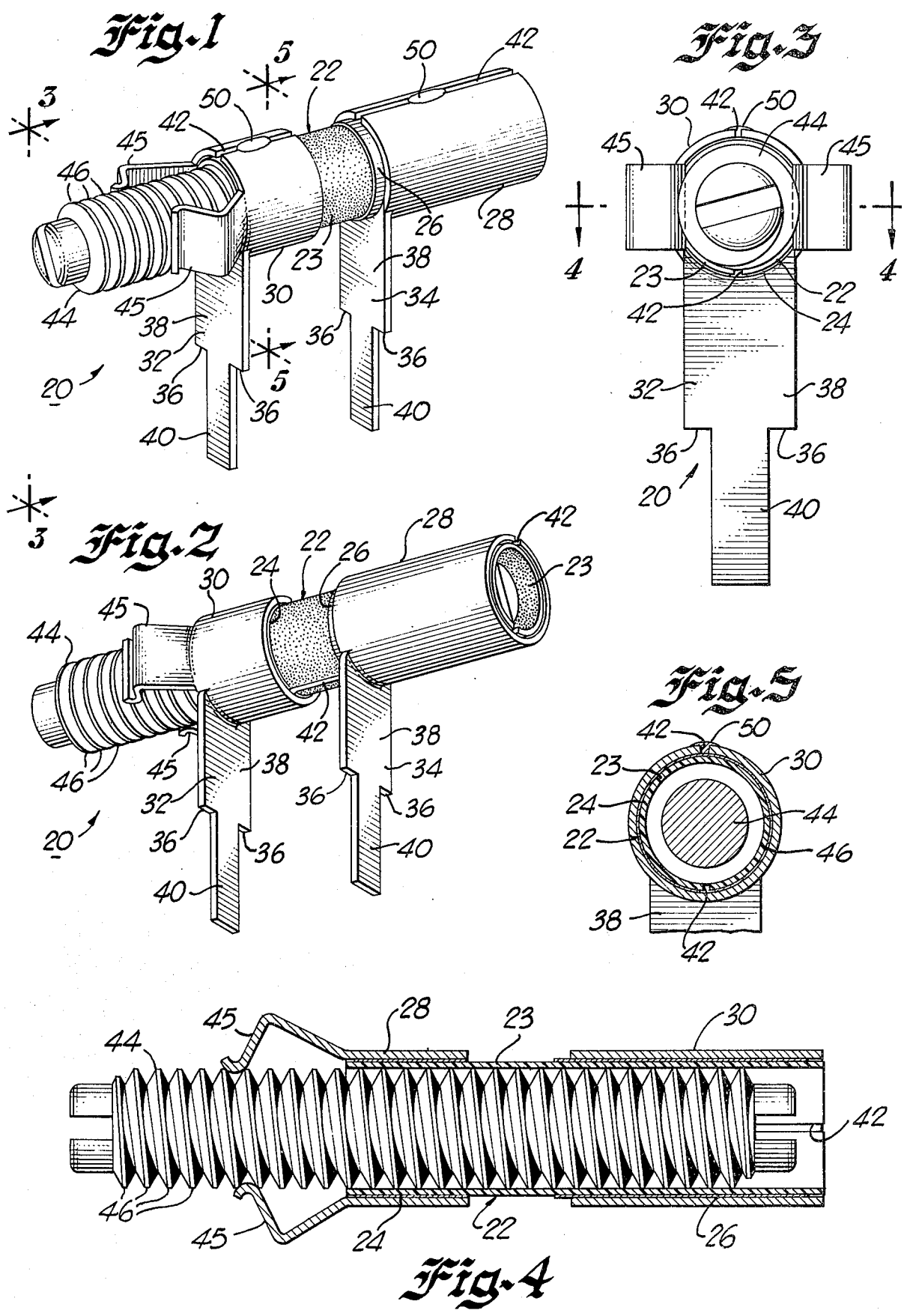

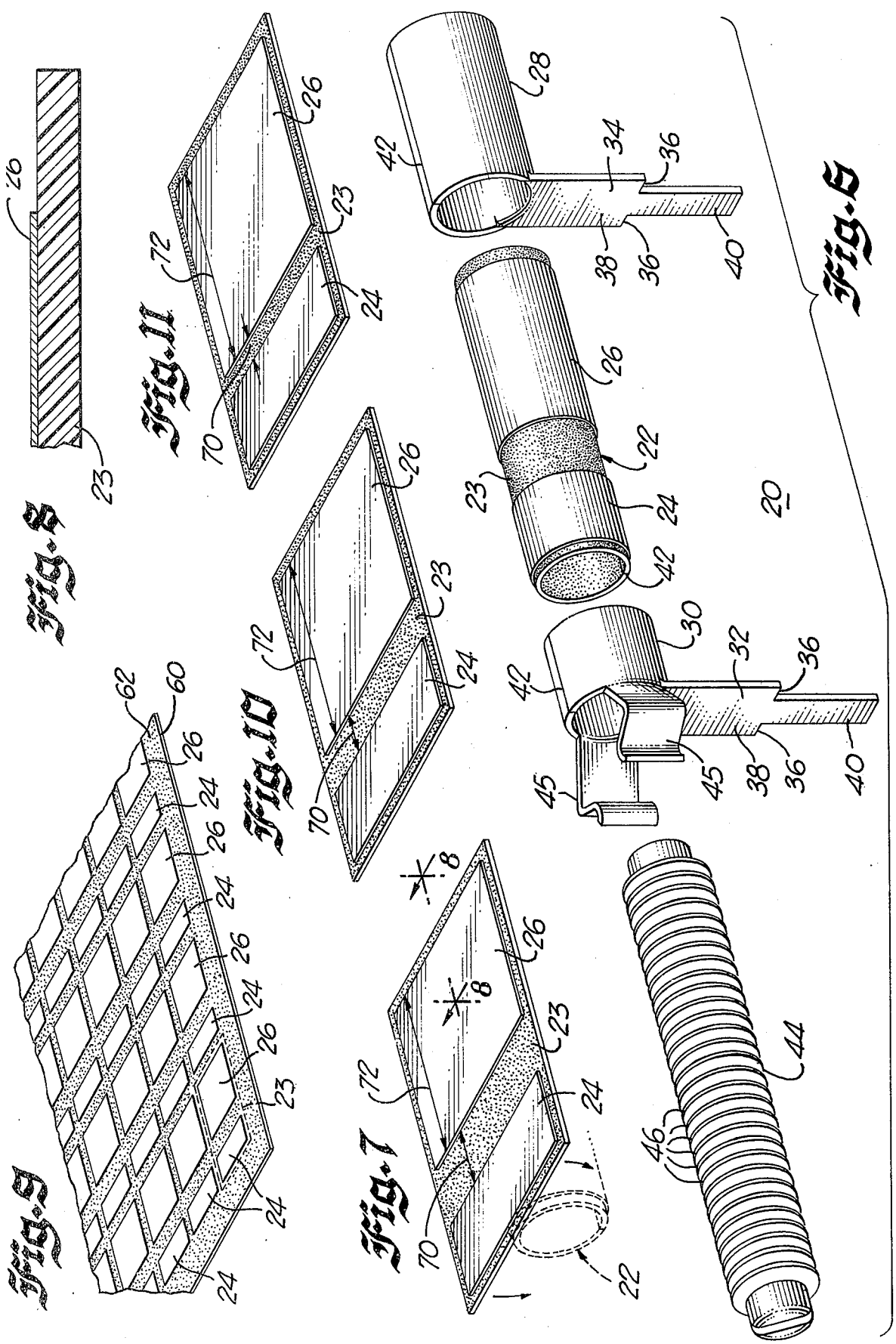

VARIABLE CAPACITOR

BACKGROUND OF THE INVENTION

A. Field of the Invention

The device and method of the present invention relate to devices for providing capacitance in electrical circuits, commonly referred to as capacitors, and, more particularly, to devices having an elongated, generally tubular shape for providing a variable amount of capacitance in electrical circuits, and commonly referred to as piston trimmers.

B. Description of the Prior Art

A piston trimmer is well known in the prior art and consists of a variable capacitor having an elongated, generally tubular shape and including a pair of capacitive plates formed by a pair of terminals spaced at opposite ends of a tubular dielectric member or core. The trimmer typically includes an elongated conductive member, such as a conductive screw, positioned within the core, electrically connected to one of the pair of terminals and variably axially movable within the core to vary the capacitance value of the trimmer.

A particular, widely used, prior art piston trimmer includes a pair of conductive terminals spaced at opposite ends of a tubularly shaped polystyrene core. A conductive screw is variably positioned within the polystyrene core. By varying the axial position of the conductive screw within the polystyrene core, the capacitance value of the trimmer is varied.

A major disadvantage of this type of piston trimmer is the unreliable and inaccurate capacitance value of the trimmer. This disadvantage is believed to result from the presence of air voids between the tips of the threads of the conductive screw and the inner surface of the polystyrene core. The presence of air voids varies the value of the dielectric constant of the dielectric medium, that is, the polystyrene core, separating the tips of the threads of the conductive screw and one of the pair of conductive terminals. The air voids may result from manufacturing tolerances and may be present upon the initial assembly of the piston trimmer. Additionally, the air voids may result from the relatively high temperatures, typically in the range of from 380°F to 430°F, encountered by the trimmer during a soldering operation, such as the rather common soldering operation of attaching the terminals of such a trimmer to a printed circuit board. These temperatures may cause the polystyrene core to plasticize or melt, resulting in the formation of the above-mentioned air voids and, possibly, in the formation of air voids between the mating surfaces of the polystyrene core and the conductive terminals which, in addition to altering the above-mentioned dielectric constant, may result in the separation of one or more of the conductive terminals from the polystyrene core.

SUMMARY OF THE INVENTION

An object of the present invention is to provide a new and improved capacitor and a new and improved method for making or assembling a capacitor.

Another object of the present invention is to provide a new and improved variable capacitor having an elongated, generally tubular shape, commonly referred to as a piston trimmer, and a new and improved method for making or assembling a piston trimmer.

Another object of the present invention is to provide a new and improved piston trimmer having an elongated, generally tubularly shaped dielectric core formed from a substantially flat, metal clad, dielectric sheet and a new and improved method for making or assembling a piston trimmer.

Briefly, the device of the present invention comprises a capacitor having an elongated, generally tubular shape and including a metal clad dielectric sheet formed into an elongated, generally tubularly shaped core that is mounted between two conductive terminals and receives an elongated conductive member electrically connected to one of the two conductive terminals. The axial position of the screw is variable to vary the capacitance of the capacitor. Preferably, the tips of the threads of the screw are ground a predetermined amount to form substantially flat tips to provide an increased conductive surface for one of the plates of the capacitor and to prevent any possible deleterious journaling of the core upon its receipt of the screw.

The method of making or assembling a capacitor in accordance with the principles of the present invention includes the steps of forming at least first and second desired configurations of conductive material on one side of a metal clad dielectric sheet, forming the dielectric sheet into an elongated, substantially tubularly shaped dielectric core with the first and second configurations of conductive material on the outer surface of the core, placing a first conductive terminal telescopically over the first configuration of conductive material and placing a second conductive terminal telescopically over the second configuration of conductive material. The method further includes the step of expanding the core radially outwardly by inserting an axially variably movable conductive screw within the core to achieve the above-mentioned conforming contact between the inner surface of the core and the tips of the threads of the conductive screw. The method additionally includes the step of electrically connecting the conductive screw with the first conductive terminal to thereby form a variable capacitor or piston trimmer. The method may also include the steps of soldering the first conductive terminal to the first configuration of conductive material and soldering the second conductive terminal to the second configuration of conductive material.

BRIEF DESCRIPTION OF THE DRAWING

The above and other objects and advantages and novel features of the present invention will become apparent from the following detailed description of a preferred embodiment of the present invention illustrated in the accompanying drawing wherein:

FIG. 1 is an upper, front perspective view of a preferred embodiment of a variable capacitor or piston trimmer constructed in accordance with the principles of the present invention;

FIG. 2 is a lower, front perspective view of the device of FIG. 1;

FIG. 3 is an enlarged, end elevational view of the device of FIG. 1 taken from line 3—3 of FIG. 1;

FIG. 4 is an enlarged, cross-sectional view of the device of FIG. 1 taken along line 4—4 of FIG. 3;

FIG. 5 is an enlarged, cross-sectional view of the device of FIG. 1 taken along line 5—5 of FIG. 1;

FIG. 6 is an enlarged, exploded, perspective view of the device of FIG. 1;

FIG. 7 is an enlarged, perspective view of a portion of the device of FIG. 1;

FIG. 8 is a further enlarged, fragmentary, crosssectional view of a portion of the device of FIG. 1 taken along line 8—8 of FIG. 7;

FIG. 9 is an enlarged, fragmentary, perspective view of a source for the portion of the device of FIG. 1 illustrated in FIGS. 7, 10 and 11;

FIG. 10 is an enlarged, perspective view of an alternate embodiment of a portion of the device of FIG. 1; and FIG. 11 is an enlarged, perspective view of an alternate embodiment of a portion of the device of FIG. 1.

DESCRIPTION OF THE PREFERRED EMBODIMENT

Referring to the drawing and initially to FIGS. 1 through 6, there is illustrated a new and improved variable capacitor or piston trimmer 20 constructed in accordance with the principles of the present invention. The trimmer 20 may be inserted in an electrical circuit to provide a variable amount of capacitance for that circuit. The trimmer 20 includes a plurality of elements assembled to provide a highly accurate, inexpensive and reliable electrical circuit element.

In accordance with an important feature of the present invention, the trimmer 20 includes a tubular dielectric member or core 22 that is capable of withstanding relatively high temperatures, for example, as encountered during soldering operations, without a substantial deterioration in the physical or electrical characteristics of the trimmer 20. This capability is achieved by forming the core 22 from a flat, thin sheet 23 (FIG. 7) of a heat resistant dielectric material which, in a preferred embodiment, may be polytetrafluoroethylene (Teflon). The polytetrafluoroethylene may, if desired, be glass reinforced to improve its stability in the presence of widely varying ambient temperatures. The core 22 includes a plurality of portions 24 and 26 of conductive material, such as metal platings. The portion 26 forms a fixed capacitive plate of the trimmer 20; and the portion 24 forms a suitable material or medium for attaching a conductive terminal to one end of the core 22. The portions 24 and 26 in a preferred embodiment are copper platings, although other suitable metals may also be used.

The trimmer 20 further includes a pair of outer, generally tubularly shaped terminals 28 and 30 that may be formed from any suitable conductive material, such as brass, and may be silver-plated prior to assembly in the trimmer 20. The terminals 30 and 28 are electrically connected to the portions 24 and 26, respectively, and include circuit connectors 32 and 34, respectively, for electrically connecting the trimmer 20 in an electrical circuit, such as by attachment to a printed circuit board. The connectors 32 and 34 each include shoulder portions 36 for engaging the upper surface of a printed circuit board. The trimmer 20 is spaced from the upper surface of a printed circuit board by the upper portions 38 of the connectors 32 and 34. Further, each of the connectors 32 and 34 includes lower portions 40 which may be attached by soldering to the printed circuit board.

In accordance with an important feature of the present invention, each of the terminals 28 and 30 and the core 22 include an axially or longitudinally extending split 42 (FIG. 6) which permits the radial, circumferential or peripheral expansion of the terminals 28 and 30 and the core 22. The terminals 28 and 30 and the core 22 are radially or peripherally expanded by the receipt of an oversized, elongated conductive screw 44 within the core 22. The screw 44 forms a movable capacitive plate of the trimmer 20. The radial or peripheral expansion of the core 22 by the screw 44 reduces the possibility of the formation or existence of air voids between the inner surface of the core 22 and the tips 46 of the threads of the screw 44, thereby ensuring that the value of the dielectric constant of the dielectric medium separating the tips 46 and the inner surface of the portion 26 remains constant.

The screw 44 may be formed from any suitable conductive material, such as brass, and may be silver-plated prior to assembly in the trimmer 20. The screw 44 is advanced within the core 22 and is electrically connected to the terminal 30 by a plurality of resilient conductive portions 45 of the terminal 30. The portions 45 may be formed in any convenient configuration to provide a resilient bias force against the screw 44.

Preferably, the tips 46 of the threads of the screw 44 are ground to form flattened tips 46 rather than pointed tips 46 prior to the receipt of the screw 44 within the core 22. For example, an elongated screw having an outer tip diameter of .138 inch may be ground to form the flattened tips 46 until the outer tip diameter equals 0.128 inch. The flattened tips 46 provide a larger capacitive plate surface area than the pointed tips and also prevent the core 22 from being damaged by preventing the formation of deep journals or threads in the core 22 as could occur by the receipt of pointed tips within the core 22.

In accordance with a further important feature of the present invention, the piston trimmer 20 is made or assembled in accordance with a novel method. Initially, the dielectric sheet 23 is formed from a relatively large metal clad dielectric sheet 60 (FIG. 9). For example, the sheet 60 may comprise a .006 inch thick sheet of glass reinforced polytetrafluoroethylene (Teflon) that includes a layer of metal plating or cladding over one entire side 62 of the sheet 60. The metal plating or cladding may vary in thickness and, in a preferred embodiment, comprises a layer of copper plating or cladding approximately 0.001 inch in thickness. The portions 24 and 26 of each sheet 23 are formed by etching undesired portions of the metal cladding from the side 62 of the sheet 60. Subsequently, the sheet 60 is severed to form the individual sheets 23. The electrical characteristics, for example, the minimum capacitance value, of a trimmer 20 may be varied by varying a dimension 70 corresponding to the spacing between the portions 24 and 26 and also by varying a dimension 72 corresponding to the length of the portion 26 (FIGS. 7, 10 and 11).

Subsequent to the severing of the individual sheets 23 from the sheet 60, the individual sheet 23 is formed into a tubular shape (FIG. 7) to form the core 22. The terminals 28 and 30 are then placed in a telescoping relationship over the portions 26 and 24, respectively, of the core 22. The screw 44 is placed within the core 22 by the resilient engagement of the portions 45 of the terminal 30 with the threads of the screw 44. The receipt of the screw 44 within the core 22 causes the radial or peripheral expansion of the core 22 and of the terminals 28 and 30 to provide the above-mentioned conforming contact between the tips 46 of the threads of the screw 44 and the inner surface of the core 22. After the receipt of the screw 44 within the core 22, a soldering compound 50 may be applied to the terminals 28 and 30 and to the portions 26 and 24, respectively, to ensure the direct, low resistance, electrical connection therebetween.

In making or assembling the trimmer 20 in accordance with the principles of the present invention, the relatively high temperatures encountered during a typical soldering operation in which the portions 40 of the circuit connectors 32 and 34 are electrically connected to a printed circuit board do not have any substantial deleterious effect upon the physical or electrical properties of the trimmer 20.

Obviously, many modifications and variations of the present invention are possible in light of the above teachings. For example, the circuit connectors 32 and 34 may be physically dimensioned and positioned on the terminals 30 and 28, respectively, in any convenient manner to enable the trimmer 20 to be positioned as desired on a printed circuit board or otherwise in an electrical circuit. Thus, it is to be understood that, within the scope of the appended claims, the invention may be practiced otherwise than as specifically described above.

What is claimed and desired to be secured by Letters Patent of the United States is:

1. A capacitor comprising
    means for electrically connecting said capacitor into an electrical circuit, said electrically connecting means comprising a first, elongated, generally tubularly shaped, radially outwardly expandable, conductive member, said first conductive member including a first elongated slot extending along the entire length of said first conductive member, and a second, elongated, generally tubularly shaped, radially outwardly expandable, conductive member, said second conductive member including a second elongated slot extending along the entire length of said second conductive member,
    means electrically insulating said first and second conductive members, said electrically insulating means comprising an elongated, generally tubularly shaped, radially outwardly expandable, dielectric member received within said first and second conductive members, said first and second conductive members being spaced apart along the length of said dielectric member, said dielectric member including a third elongated slot extending along the entire length of said dielectric member, and
    means radially outwardly expanding said first and second conductive members and said dielectric member to thereby increase the widths of said first, second and third slots, said expanding means comprising an elongated conductive member received within said dielectric member and electrically short circuited to said first conductive member.

2. A capacitor as defined in claim 1 wherein said elongated member comprises an elongated conductive member movable along the longitudinal axis of said dielectric member, said elongated conductive member comprising a variable or movable capacitive plate of said capacitor.

3. A capacitor as defined in claim 2 wherein said elongated conductive member comprises an elongated conductive screw, said screw including a plurality of flattened thread tip portions engaging the inner surface of said dielectric member.

4. A capacitor as defined in claim 1 further comprising first and second, spaced, low resistance conductive means coated on the outer surface of said dielectric member, one of said first and second conductive means forming a fixed capacitive plate of said capacitor.

5. A capacitor as defined in claim 4 wherein said first and second conductive members comprise first and second conductive terminals, respectively, that physically support said capacitor in a fixed condition, spaced from a mounting means or base for said electrical circuit.

6. A capacitor as defined in claim 5 further comprising first means electrically connecting said first conductive terminal to said first conductive means and second means electrically connecting said second conductive terminal to said second conductive means.

7. A capacitor as defined in claim 6 wherein said first and second electrically connecting means comprise solder compounds.

8. A capacitor as defined in claim 5 wherein said first and second elongated slots respectively overlie elongated portions of said first and second low resistance conductive means.

9. A capacitor as defined in claim 1 wherein said dielectric member comprises a sheet of polytetraflouroethylene.

10. A capacitor comprising
    a first, fixed, capacitive plate,
    a second, variable, capacitive plate, and
    means physically spacing apart and electrically insulating said first and second capacitive plates, said spacing and insulating means comprising an elongated, generally tubularly shaped, radially outwardly expandable, dielectric member, said dielectric member including an elongated slot extending along the entire length of said dielectric member,
    said second capacitive plate comprising means radially outwardly expanding said dielectric member to thereby increase the width of said slot, said expanding means comprising an elongated member received within said dielectric member.

11. A capacitor as defined in claims 10 wherein said first, fixed, capacitive plate is disposed on the outer surface of said dielectric member.

12. A capacitor as defined in claim 11 wherein said dielectric member comprises a dielectric member formed from polytetrafluoroethylene.

13. A capacitor as defined in claim 10 wherein said elongated member comprises an elongated conductive screw having a plurality of flattened thread tip portions engageable with the inner surface of said dielectric member.

* * * * *

Disclaimer 3,938,012.—*Vincent J. Patti*, Norridge, Ill. VARIABLE CAPACITOR. Patent dated Feb. 10, 1976. Disclaimer filed Feb. 14, 1977, by the assignee, *Standex International Corporation.*

Hereby enters this disclaimer to claims 10 and 11 of said patent.

[*Official Gazette April 12, 1977.*]